Sept. 17, 1968
C. DOOLITTLE
3,401,574
MULTIPLE VALVE CONTROL DEVICE WITH POSITION LOCK
Filed July 21, 1966
2 Sheets-Sheet 1
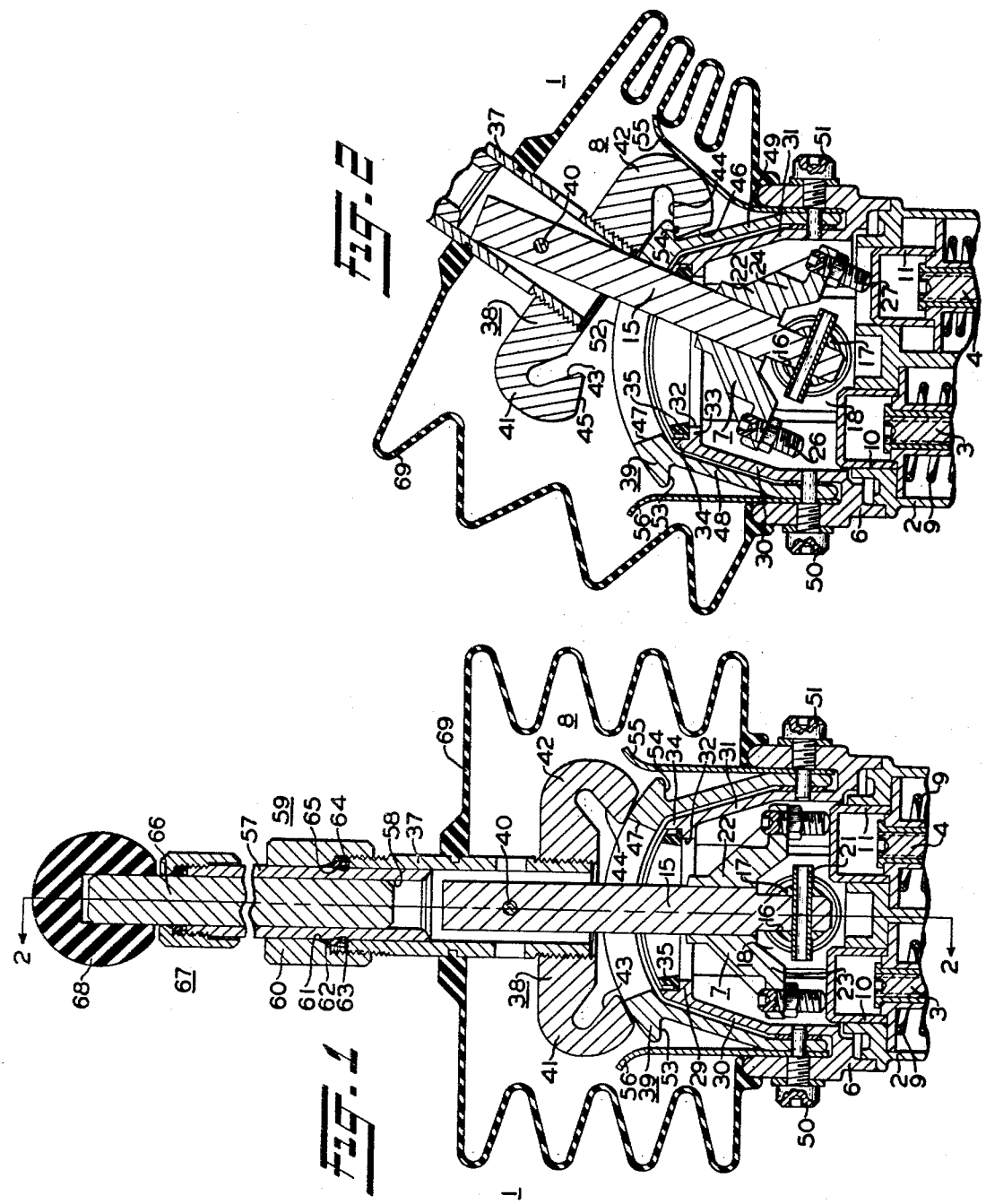
INVENTOR.
CHARLES DOOLITTLE
BY
Ralph W. McIntire, Jr.
ATTORNEY Sept. 17, 1968 C. DOOLITTLE 3,401,574
MULTIPLE VALVE CONTROL DEVICE WITH POSITION LOCK
Filed July 21, 1966 2 Sheets-Sheet 2
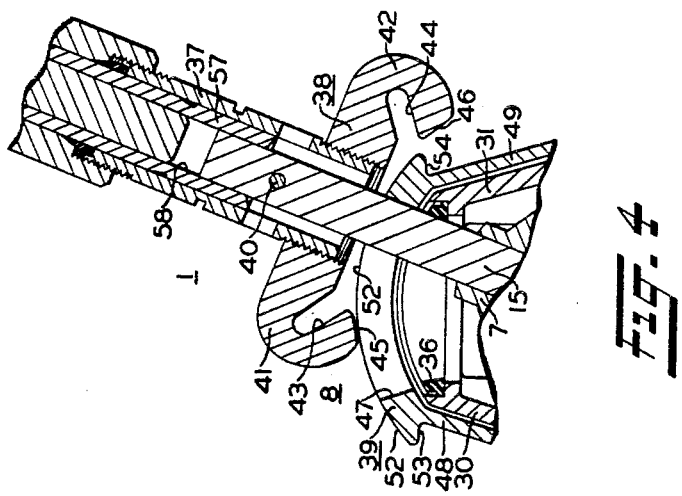
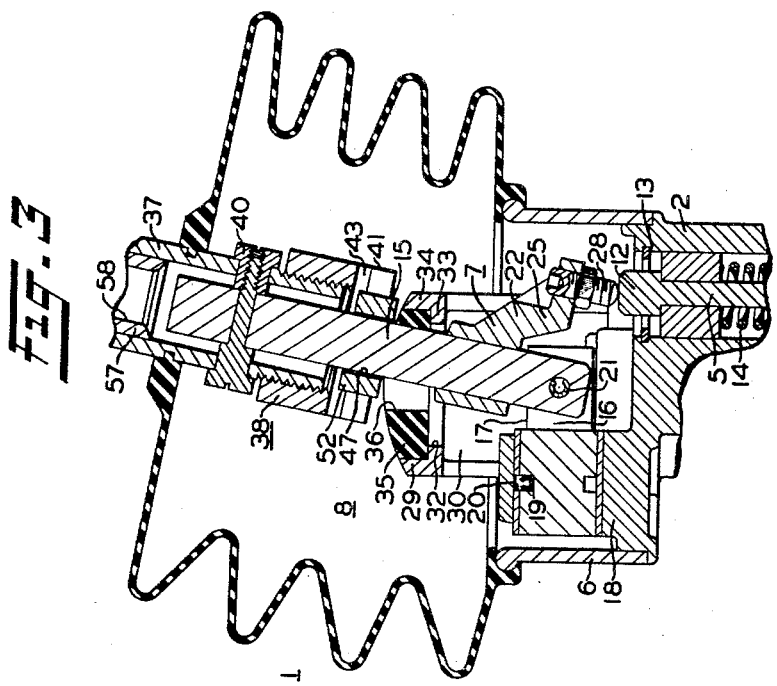
INVENTOR.
CHARLES DOOLITTLE
BY
Ralph W. McIntire, Jr.
ATTORNEY

United States Patent Office 3,401,574
Patented Sept. 17, 1968

3,401,574
MULTIPLE VALVE CONTROL DEVICE WITH POSITION LOCK
Charles Doolittle, Lexington, Ky., assignor to Westinghouse Air Brake Company, Wilmerding, Pa., a corporation of Pennsylvania
Filed July 21, 1966, Ser. No. 566,943
12 Claims. (Cl. 74—471)

ABSTRACT OF THE DISCLOSURE

A multiple valve control device with position lock in which a universally pivoted lever is movable about the pivot from a neutral position in a direction to operate one valve and is simultaneously movable perpendicularly to the first direction in either a left or right direction about the pivot to operate a second and third valve, respectively. A latch saddle pivotally movable with the lever in the first direction carries a pair of leftwardly and rightwardly extending latches engageable by a pair of correspondingly extending latches carried on one end of a lever extension pivotally attached to the first mentioned lever so that when the lever extension is urged leftwardly or rightwardly, the lever extension pivots relative to the lever so that corresponding latches engage to lock the lever in the left or right position while the lever is free to move in the first direction. A manually operable lock mechanism is actuable to prevent relative pivotal movement between the lever and lever extension to prevent engagement of the latching mechanism.

---

Heretofore, in valve control mechanisms of the aforementioned type, selective position locking of a universally pivoted, manually operated lever carrying a valve actuator means has been accomplished by spaced detent means disposed in respective great circles on a spherical member fixed with respect to the universal pivot, in cooperation with a groove, the lever extending through the spherical member, and the grooved member being disposed on a member movable with the lever biased toward the spherical member, so that lateral displacement of the lever and groove member from the central position to effect selective engagement of the groove with either one of the detents effects position locking of the lever and associated control mechanism and depression of a return biased valve actuator, while providing for longitudinal sliding action of the groove over the detent to provide for additional valve operating action of the valve control mechanism within the locked position. Unlocking of the mechanism is effected by manual force urging the lever toward the center position. This structure, as disclosed and claimed in Patent No. 3,131,573, issued to A. J. Bent on May 5, 1964, and assigned to the same assignee as the present invention, is effective for its intended purpose, but under operating conditions on machinery having a large amount of vibration, the detent and groove locking means may tend to disengage and release the locking mechanism without a deliberate unlocking operation thereof by the machine operator whereupon the operating lever return biasing means will return the lever to the center position.

It is an object of the present invention to provide in a multiple valve control device with position locking means generally of the type described, an improved more positive position locking means which will remain locked in spite of heavy vibration, yet may be easily and quickly released or unlocked by the operator.

In the present invention, this object is achieved by sectionalizing the lever, one section of the lever carrying thereon the multiple valve control or actuating means and universally mounted on the valve body containing the plural valve mechanism therein, and a second section of the lever having one end thereof telescoped over and internally pivotally attached to the distant end of the one lever section with clearance therebetween so that the second lever section may pivotally rock in a predetermined plane with respect to the one lever section. A third section of the lever has one end telescopically received within the other end of the second lever section and releasably lockable in different telescoped positions therein, one such telescoped position disposing the inner end of said third lever section telescopically over the distal end of the first lever section to prevent pivotal action between said first and second lever sections. A pair of laterally opposing latch devices are outwardly disposed on the one end of the second lever section straddling the pivot between said first and second levers, the latches being recurved inwardly in the plane of the pivotal action between the first and second lever sections, the ends of the catches being normally disposed in sliding engagement with a cylindrical surface of a latch saddle attached to the valve body member, through which latch saddle the first lever section extends, the cylindrical surface being concentrically disposed with respect to the universal pivot means. A pair of spaced latch means are disposed at the ends of the cylindrical surface in the plane of pivotal action between the first and second lever sections for engagement with a corresponding one of the aforementioned latch devices when the levers are moved as a unit in the plane of pivotal action between the first and second lever sections. When one of the latch devices is moved over the end of the cylindrical surface, the second lever section pivots about said pivot between it and the first lever section, thus effecting engagement between the latch device and the corresponding latch means on the latch saddle, the return force inherent in the operated valve device holds the latch device and latch means in engagement until a manual return force is applied to the third lever section to effect pivotal realignment between the first and second lever sections for unlocking the latch device and latch means. The latch saddle is pivoted for movement in a direction perpendicular to the above-described lateral movement of the lever whereby the lever, while locked in either one of the lateral valve operating positions described, may be pivoted in said perpendicular direction to operate a third valve mechanism, if desired. When the third lever section is locked in position to prevent pivotal movement between the first and second lever sections, the latch device and latch means are rendered inoperative so that the return force of the operated valve mechanism will return the lever to the center position when manual force thereon is removed.

This and other objects will become more readily apparent in the following description, taken in conjunction with the drawing, in which:

FIG. 1 is a fragmental front elevational view, taken in section, of a multiple valve control device with the position lock of my invention and showing the control device in the normal unlocked position;

FIG. 2 is a view similar to that of FIG. 1 and showing the control device locked in one of its valve control positions;

FIG. 3 is a side elevational view of the device of FIGS. 1 and 2 taken along the line 2—2 of FIG. 1 showing the control device in another valve operating position; and FIG. 4 is a sectional view of the device as shown in FIG. 2 showing the position lock device in the latch nullifying condition.

Referring now to the drawing, there is shown in FIGS. 1, 2 and 3 a valve device generally indicated at 1 and comprising a valve casing generally indicated at 2 having three valve devices 3, 4 and 5 disposed therein, and a casing cover generally indicated at 6 and including therein a lever operated valve control device 7 and a releasable position holding mechanism 8 cooperating with the valve control device to hold it in any one of two selected valve actuating positions.

The valve devices 3, 4 and 5 in the casing 2 may be of any suitable type, each adapted to control fluid in a fluid pressure system, but, preferably, for the purpose of describing examples of valve devices suitable for actuation by the hereinafter described valve control means 7 and associated position holding means 8, the casing 2 and valves 3, 4 and 5 may be of the type and arrangement identical to that disclosed in the aforementioned Patent No. 3,131,573. Specifically, the valves 3 and 4 may be identical and of the self-lapping type biased into their normal positions shown in FIG. 1 by internal springs 9, 9, in which position the associated delivery ports, not shown, are communicated with exhaust, not shown, and the supply ports, not shown, are closed, the valves being operable upon depression of the corresponding thimbles 10 and 11, respectively, to close the associated exhaust and communicate the associated supply port with the associated delivery port. The valve 5, identical to the third valve in the aforementioned patent, is similar in operation to valves 3 and 4 and is shown with stem actuator 12 depressed in FIG. 3, and is normally biased upwardly into engagement with map ring 13 by spring return 14.

The valve control mechanism 7 for selectively and concurrently operating the valves 3, 4 and 5 is basically similar to that disclosed in the aforementioned Patent No. 3,131,573 and comprises a control lever member 15 having at one end thereof a pair of opposing flat sides extending into a slot 16 diametrically extending through a cylindrical member 17 which in turn is disposed for rotation about a horizontal axis in a bore in a portion 18 of the casing 2. A transverse pin 19 extends through the cylindrical member 17 and body portion 18 tangentially to a groove 20 to prevent axial movement of cylindrical member 17 relative to body portion 18. A pivot pin 21 extends transversely through cylindrical member 17, groove 16 and the flat sides of lever member 15 so that the pivotal movement of lever 15 about pin 21 in conjunction with rotatable movement of cylindrical member 17 about its axis comprises a universal pivot for lever member 15.

To directly actuate the valves 3, 4 and 5 in response to universal movement of lever 15, a web-like member 22 having three radially extending fingers or arms 23, 24, 25, is coaxially fixed on the pivoted end of lever member 15 adjacent the pivot point, with arms 23 and 24 being opposed and with arm 25 extending perpendicularly thereto. The ends of the arms are each provided with an axially adjustable lug 26, 27, 28, respectively, having a spherical end engageable with a corresponding one of the valve operating thimbles 10 and 11 or valve stem 12. Thus, as best seen in FIG. 1, under the urging of the valve return springs, and when no manual force is applied to lever member 15, the lever member 15 is normally centered by simultaneous contact between each of the lugs 26, 27, and 28 with the corresponding valve actuator.

In order to define a path or paths of movement for the lever member 15 as it rocks about its universal pivot 16 and 21, and to define the limits of rocking movement, there is provided integral with the cover 6 and inverted U-shaped guide member comprising a bight portion 29 attached to and spacing a pair of leg members 30, 31. The bight portion 29 is disposed above the universal pivot 16 and 21 and is centrally apertured at 32 receiving therethrough the lever member 15. The periphery of the aperture 32 comprises a ledge 33 (FIG. 3) cooperating with an upwardly extending portion 34 to form a seat for a replaceable insert member 35 which is centrally apertured or slotted at 36 in any suitable manner to define a path or paths of movement for the lever member 15 as it is moved about the aforementioned universal pivot 16 and 21. It is to be noted that the insert 35 may be replaced by other suitable insert members, not shown, which may define different paths of movement for lever member 15. The insert member shown is apertured to permit full universal movement of lever member 15, including movement to the left or right from center to operate either of valve members 3 or 4, respectively, or, while in either of the left or right positions to operate rearwardly as in FIG. 3, to operate valve member 5 simultaneously therewith, or, while centered with respect to valves 3 and 4, to move rearwardly to independently operate valve member 5.

The latch mechanism 8 for releasably locking or holding lever member 15 in either one of its left or right limit positions to operate valve members 3 or 4, respectively, while at the same time providing for rearward movement of the lever member 15 to simultaneously operate valve member 5, comprises a lever member 37 pivotally attached to the aforementioned lever member 15 and carrying at one end a latch means 38 cooperating with a latch saddle member 39 carried by the cover 6.

The lever member 37 comprises a hollow cylinder receiving in one end thereof with substantial clearance the upper end of lever member 15 which is pivotally attached thereto a predetermined distance from the end of lever member 37 by means of a pivot pin 40 extending through both lever members 15 and 37, and disposed perpendicularly with respect to the aforementioned pivot pin 21 so that lever member 37 may rock with respect to lever member 15 in the same left and right directions lever member 15 is rockable with respect to the aforementioned pivot 17. The latch member 38 is axially threadedly received on the end of lever member 37 for axial adjustment relative thereto and includes a pair of oppositely disposed latch members 41 and 42 extending outwardly from the lever member 37 in the aforementioned left and right pivoting directions of lever member 37 relative to lever member 15. Each latch member 41 and 42 is recurved downwardly and inwardly forming a latch face 43, 44 for cooperative engagement with the hereinafter described latch saddle 39, and having end faces 45, 46, respectively, for slidably engaging the latch saddle to hold lever members 15 and 37 in an aligned position, as hereinafter described.

The latch saddle 39 comprises an inverted, generally U-shaped member overlying the hereinbefore described guide member with slight clearance therebetween, and comprises a bight portion including a slot 47 and a pair of opposing leg members 48, 49, pivotally attached at their ends of opposite sides of cover 6 by pivot pins 50, 51, respectively, which pins are aligned with each other and the center of rotation of the aforementioned pivot pin 21 in the direction of the aforementioned left and right pivotal movement of lever member 15 relative to pivot 37, so that the latch saddle is pivoted for movement rearwardly toward valve member 5 in a direction perpendicular to the aforementioned left and right directions. The slot 47 is of uniform width and extends in the aforementioned left and right direction providing freedom of movement of lever member 15 therein during left and right movement thereof to operate valve members 3 and 4, and pivots in the rearward direction with the rearward movement of lever member 15 to operate rear valve member 5.

The outer and upper face 52 of the bight portion of latch saddle 39 is curved in the longitudinal left and right directions so as to comprise a cylindrical surface having the center of curvature thereof coincident with the center of movement of pivot pin 21 so that sliding movement of the aforementioned end faces 45, 46 of latch members 41, 42 therealong in response to left and right movement of lever member 15 holds lever members 15 and 37 in the alignment shown in FIG. 1. The opposite ends of the cylindrical surface are recurved downwardly and inwardly to form latch surfaces 53, 54, respectively, so that movement of the lever member 15 to either the left or right extremity in aperture 36 in the guide member in response to manual force applied to lever member 37 disposes the corresponding end face 45 or 46 beyond the extremity of the cylindrical surface 52 providing rotation of lever member 37 about pivot 40 to effect face to face engagement between the corresponding latch faces 43, 53, or 44, 54. It will be observed that each of the latch faces 53, 54, on the latch saddle 39 forms with the outer surface of the corresponding leg member 48, 49, respectively, a groove having the apex thereof pointing in the direction of and substantially bisected by the component of return spring force in the valve members 3 and 4 acting upon the lever member 15 to return the same to the center position so that the slope of the latch faces 53, 54 when engaged by the corresponding latch faces 43, 44 on the latch members 41, 42, the spring return force in the valves 3, or 4 will by a camming action direct the correspondingly shaped intersection of latch faces 43, and 44 relative to end faces 53, 54 into the aforementioned groove to more firmly engage the latch mechanism.

In order to further assure that the latch mechanism will remain in a position holding latch position under conditions of extreme vibration, a pair of leaf spring means, 55, 56 are each attached to one of the pivot pins 50, 51 and extend upwardly for engagement with the latch members 41, 42 for providing an additional force in the direction of the aforementioned component of spring return force to urge the latch members 41, 42 into the aforementioned grooves. The springs 55, 56 may be keyed, not shown, in any suitable conventional manner for pivotal movement with latch saddle 39.

In order to provide for nullification of the operation of the latch mechanism 8 so that the lever member 15 may be moved to the extremities of its operating positions, as shown in FIG. 4, without operation of the latch mechanism, a tubular member 57 is telescopically received in the upper end of the aforementioned lever member 37 for axial movement from a first position in which the inner end thereof is disengaged relative to lever member 15 as shown in FIGS. 1, 2, 3 to an inward position in which the end of the bore 58 thereof receives therein the upper end of lever member 15, as shown in FIG. 4, thus preventing pivotal movement between lever members 15 and 37 to thereby prevent operation of the above described latch mechanism 8. The mouth of bore 58 is flared to guide the upper end of lever member 15 into bore 58 in the event lever members 15 and 37 are not perfectly aligned when tubular member 57 is moved to the above described lower position.

A lock mechanism 59 of any suitable type is provided for releasably locking the tubular member 57 in each of the aforementioned telescoped positions. The particular locking mechanism shown is similar to that disclosed and claimed in copending application Ser. No. 419,892, filed on Dec. 21, 1964, by Joseph D. Broadhurst, Jr., and assigned to the same assignee as the present invention, now Patent No. 3,338,607, issued Aug. 29, 1967, comprises a nut 60 sleeved on tubular member 57 and threadedly received on the upper end of lever member 37, as shown in FIG. 1 so that the nut when tightened on lever member 37 will, by cam action of a sloped internal shoulder 61, compress into tight frictional engagement with the tubular member 57, a resilient annular member 62 normally loosely surrounding tubular member 57 and seated on the end of lever member 37. A compression ring 63, disposed in a counterbore 64 in the end of lever member 37 snaps inwardly into an annular groove 65 in tubular member 57 when the groove is disposed opposite the compression ring, thereby defining the outer limit of movement for tubular member 57 relative to lever member 37 as shown in FIG. 4, when the nut 60 is loosened and the tubular member 57 is lowered to engage the end of lever 15, compression ring 63 is radially expanded in counterbore 64 as the tubular member 57 is moved downwardly, and when the tubular member is so positioned nut 60 is tightened to lock tubular member 57 in position.

To provide rigidity for lever member 37 and tubular member 57 and at the same time provide for extension of the assembly thereof, as desired by the machine operator, a solid rod 66 is telescopically received in the upper end of tubular member 57 and adapted for releasable locking thereof in a variety of telescoped positions by means of a releasable lock means 67 similar to the above described lock means 59. A knob 68 is attached to the end of the solid rod 66 to serve as a hand grip.

To protect the mechanisms from dust and weather a resilient guard or shroud 69 is attached to cover 6 and the lever member 37.

In the operation of the device, starting from the centralized position of the lever, as shown in FIG. 1, the valve devices 3, 4 and 5 are closed with the thimbles 10 and 11 and valve stem 12 in the fully raised normal position as shown, under the urging of fluid pressure in the system and the force of return springs 9, 9 and 14, the lugs 26, 27 and 28 are resting upon the corresponding thimbles 10 and 11 and valve stem 12, respectively, lever member 15 is centered in aperture 36 and slot 47, the ends 45, 46 of latch members 41, 42 respectively are engaged with cylindrical surface 52 of latch saddle 39, thus aligning lever member 15 with lever member 37, and the tubular member 57 is in its uppermost position.

If now it is desired to operate valve device 4, as shown in FIG. 2, manual force is applied to knob 68 in the rightward direction, thus moving rightward as a single rigid unit the tubular member 57, the lever element 37 and lever element 15, the aligned condition between levers 15 and 37 being maintained during this movement by the sliding engagement of end faces 45, 46 of latch members 41, 42, respectively, with the cylindrical surface 52 of latch saddle 39. If it is desired to fully operate valve device 4 with the lever element 15 locked in the fully operating rightward position, rightward movement is continued to the rightward limit defined by engagement of lever element 15 with the right end of aperture 36 in insert 35 of the guide path member. Immediately before lever element 15 reaches the aforementioned limit position, the end of latch member 42, as defined by the intersection of latch surface 44 and end face 46, rides over the lip defined by the intersection between curved surface 52 and latch surface 54 permitting lever member 37 to pivot to the right with respect to lever member 15 about pivot pin 40 in response to the applied manual force, and effecting sliding engagement of latch face 44 with latch face 54 into the groove defined by the latch face 54 and the leg 49 of the latch saddle. Simultaneously with engagement of the latch faces 44 and 54, leaf spring 56 is engaged by latch member 42. Thereafter, upon removal of the applied manual force, the return force upon thimble 11 as provided by spring 9 and the force of fluid pressure in the system upon the valve device 4 combined with the urging of leaf spring 56, provides a component of force in a leftward direction upon web member 24 and lever element 15 which tightly urges latch face 44 into tighter engagement with latch face 54, thus tightly latching the position holding mechanism 8 to hold the lever element 15 in the rightward limit position shown.

If now it is desired to unlatch the position holding mechanism and recenter the lever 15 to change or cease operation of valve device 4, a leftward acting manual force is applied to knob 68. Inasmuch as leftward movement of lever element 15 is temporarily prevented by the aforementioned engagement between latch faces 44 and 54, the upper end of lever element 37 begins leftward pivotal motion about pivot pin 40 with respect to lever element 15 while effecting simultaneous rightward movement of the lower end of lever element 37 and latch member 42, which in turn effects gradual sliding disengagement between latch faces 44 and 54 as the intersection between latch face 44 and end face 54 of latch member 42 slides out of the aforementioned groove defined by latch face 54 and leg member 49 of the latch saddle 39. As the lever elements 15 and 37 approach alignment during pivotal motion therebetween, latch face 44 completely disengages latch face 54 thus releasing the latch mechanism 8 so that end face 46 slidingly reengages with cylindrical surface 52, and end face 45 of the opposing latch member 45 also reengages cylindrical surface 52. With lever members 15 and 37 now in rigid alignment, lever element 15 is moved to the recentered position either by continuation of the leftward manual force or by return force of the return spring and the fluid pressure in the system acting on the valve device 4.

If, while the lever element 15 is latched in the rightward position as above described, it is desired to operate the rearward valve device 5, rearward manual force is applied to knob 68 moving lever member 15 about pivot pin 21 in the universal joint. Thereupon, because of the pivotal mounting of latch saddle 39 on pivot pins 50, 51, the lever element 15 engages the rear side of slot 47 effecting rearward movement of the latch saddle in conjunction with the lever element 15, as shown in FIG. 3 lowering arm 25 to depress valve stem 12, while arm 24 maintains valve device 4 in the fully operated condition. If the rearward manual force is removed, the valve return force in valve device 5 will automatically return the lever element 15 to position disclosed in FIG. 2. If it is desired to cease operation of valve device 4 while continuing operation of the valve device 5, leftward manual force applied to knob 68 will effect release of the latch mechanism in the manner above described.

From the foregoing and referring to FIG. 3, it will be readily apparent that the application of rearward force on knob 68 may be utilized to operate rearward valve device 5 independently of valves 3 and 4 if the lever mechanism is moved immediately rearward from the centered position shown in FIG. 1.

From the foregoing it is readily apparent that the lever 15 may be positively held with easy release in either of two valve operating positions while providing for free movement to a third valve operating position while so releasably held.

If it is desired to nullify the latch mechanism 8, tubular member 57 is locked in its lower position to prevent relative pivotal movement between lever elements 15 and 37, as in FIG. 4, so that movement of lever element 15 either leftward or rightward to the limit positions prevents engagement of the latch faces 44, 54 on the right, and latch faces 43, 53 on the left.

Having now described the invention, what I claim as new and desire to secure the Letters Patent, is:

1. A multi-position operating mechanism having a releasable position holding means; comprising:
   (a) a support member;
   (b) a first lever member pivotally attached to said support member for movement about a first axis in a predetermined path to effect control operations in accordance with the rotational position thereof relative to said axis along said path;
   (c) means biasing said lever toward a normal position;
   (d) means on said support member having a cylindrically curved exterior surface of predetermined length along said path with the cylindrical axis coaxially disposed said axis, the radius of curvature of said surface being less than the length of said first lever member;
   (e) said cylindrical surface terminating at a lip spaced from said normal position along said cylindrical surface and protruding in a direction away from said normal position, said lip having an undersurface comprising a latch;
   (f) a second lever member attached to said first lever member at a second pivot point disposed outwardly of said cylindrical surface for movement about an axis parallel disposed with said first axis;
   (g) a pair of spaced leg members disposed on said second lever member, each having an end portion slidably engaged with said cylindrical surface to normally maintain said first and said second lever members in a predetermined non-pivotal relationship when manual force is applied to said second lever member to move said second lever member about said first axis;
   (h) one of said leg members having a surface contour adapting said one leg for movement around said lip and into latching engagement with said undersurface in response to pivotal movement of said second lever member with respect to said first lever member when the application of manual force to said second lever moves said first lever member away from said normal position to a predetermined position effecting movement of said one leg member off said cylindrical surface and over said lip.

2. The multi-positional operating mechanism recited in claim 1, in which:
   (a) said surface contour of said one leg member comprises an inwardly disposed surface comprising a latch surface for engaging said undersurface of said lip.

3. The multi-positional operating mechanism as recited in claim 2, in which:
   (a) said undersurface of said lip is disposed at an angle with respect to the component of lever return force provided by said biasing means on said first lever member so as to tightly engage said latch surface on said one leg into latching engagement with said latch on said lip.

4. The multi-positional operating mechanism as recited in claim 1, in which:
   (a) said first axis comprises one axis of rotation of a universal pivot attaching said first lever member to said support member;
   (b) said means on said support member is pivotally disposed thereon for movement of said cylindrical surface about an axis through said universal pivot and perpendicularly intersecting said axis of said cylindrical surface, and;
   (c) means providing engagement between said first lever member and said means on said support member for effecting movement of said means on said support member about its axis of rotation in following relationship with movement of said first lever member in any direction other than about said first axis.

5. The multi-position operating mechanism as recited in claim 4, in which guide means are disposed on said support member for defining the limits of movement of said first lever about said universal pivot.

6. A multi-position operating mechanism having a releasable position holding mechanism, comprising:
   (a) a support member;
   (b) lever means attached to said support member for movement about a universal pivot to effect control operations in accordance with the disposition thereof relative to a normal position;
   (c) a latch saddle means attached to said support member and having a portion thereof displaced from said universal pivot, said displaced portion having a slot means therein receiving said lever means therethrough for movement along said slot;
   (d) means on said latch saddle cooperating with means on said lever means and operable to hold said lever means in one or more positions along said slot displaced from said normal position after the removal of a force applied to move said lever to said one or more positions, and operable to release said lever means from said one or more positions when a force is applied to said lever means to return the lever to the normal position; and (e) means pivotally attaching said latch saddle to said support member for movement with said lever about said universal pivot in a direction transversally of said slot means.

7. A multi-position operating mechanism having a releasable position holding means, comprising:
(a) a support member;
(b) a first lever member pivotally attached to said support member to effect control operations in accordance with the position of the lever along a path about a first axis of said pivot relative to a normal position;
(c) means on said support member having a cylindrically curved exterior surface of predetermined length along said path, with the axis of said cylindrical surface coaxially disposed with said first axis, the radius of curvature of said surface being less than the length of said first lever;
(d) a first latch means disposed at one end of said cylindrical surface;
(e) a second lever member pivotally attached to said first lever member at a pivot outwardly of said cylindrical surface for movement about an axis parallel disposed with said first axis;
(f) a pair of spaced leg members disposed on said second lever member, each having an end portion slidably engaged with said cylindrical surface to normally maintain said first and said second lever members in a predetermined non-pivotal relationship when manual force is applied to said second lever member to move said first and second lever members about said first axis;
(g) one of said leg members having a second latch means latchingly engageable with said first latch means in response to pivotal movement of said second lever member with respect to said first lever member when the application of manual force to said second lever member moves said first lever member away from said normal position to a predetermined position effecting movement of said one leg member off said cylindrical surface and into engagement with said first latch means; and
(h) means for releasably locking said first and second lever means in said non-pivotal relationship to prevent engagement of said first and second latch means.

8. The multi-position operating mechanism as recited in claim 7 in which said releasable locking means comprises means releasably engageable with said first and said second lever members to lock said first and second lever member in said non-pivotal relationship.

9. The multi-position operating mechanism as recited in claim 7, in which:
(a) one of said first and second lever members includes an axial bore receiving therein the other of said first and second lever members, said bore being larger in diameter than the outside diameter of said other lever member providing a space therebetween to facilitate pivotal movement between said first and second lever members; and
(b) said releasable locking means comprising means removably disposed in said bore between said first and second lever members to fix said first and second lever members in said non-pivotal relationship.

10. The multi-position operating mechanism as recited in claim 9, in which said means removably disposed in said bore between said first and second lever members comprises a member disposed in said bore for axial movement therein from a first position in a first direction to a second position within said space in engagement with said bore and said other lever member to prevent relative pivotal movement therebetween and movable in a reverse direction out of said space to said first position.

11. The multi-position operating mechanism as recited in claim 10, in which:
(a) said means removably disposed in said bore comprises a tubular member axially slidable therein; and
(b) means for selectively releasably locking said tubular member in each of said first and second positions.

12. A multi-position valve control device having a releasable position holding means, comprising:
(a) support means having first and second valve means disposed therein;
(b) lever means attached to said support means by a universal pivot means and having a normal pivotal position;
(c) means carried by said lever means for operating said first valve means in accordance with the pivotal displacement of said lever means away from a first plane including said normal position;
(d) means carried by said lever means for operating said second valve means in accordance with the displacement of the lever means away from a second plane including said normal position, said second plane being disposed perpendicularly to said first plane;
(e) latch means carried by said lever means;
(f) second latch means carried by said support means for rotation about an axis disposed within said second plane and intersecting said universal pivot means perpendicularly to said first plane, and engageable with said lever means for movement therewith in displacement away from said second plane;
(g) said second latch means operable in response to movement of said lever means a predetermined pivotal distance from said first plane to latchingly engage said first latch means to hold said lever means at said predetermined distance for all pivotal positions of said lever means relative to said second plane or until manual force is applied to move said lever means toward said first plane.

References Cited
UNITED STATES PATENTS

| | | | |
|---|---|---|---|
| 284,703 | 9/1883 | Zschech | 74—525 |
| 610,064 | 8/1898 | Köttgen | 74—471 X |
| 2,094,976 | 10/1937 | Bachman | 74—473 |
| 2,336,715 | 12/1943 | Casler et al. | |
| 3,131,573 | 5/1964 | Bent | 74—471 |
| 3,338,607 | 8/1967 | Broadhurst. | |

FRED C. MATTERN, JR., *Primary Examiner.*

C. F. GREEN, *Assistant Examiner.*